(12) United States Patent
Thompson et al.

(10) Patent No.: US 11,224,159 B2
(45) Date of Patent: Jan. 18, 2022

(54) DOWNFORCE MONITORING SYSTEM FOR AN AGRICULTURAL ROW UNIT

(71) Applicant: CNH Industrial Canada, Ltd., Saskatoon (CA)

(72) Inventors: Dennis George Thompson, Saskatoon (CA); Nicholas George Alfred Ryder, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 214 days.

(21) Appl. No.: 16/457,356

(22) Filed: Jun. 28, 2019

(65) Prior Publication Data
US 2020/0404837 A1    Dec. 31, 2020

(51) Int. Cl.
*A01C 7/20* (2006.01)
*A01B 63/00* (2006.01)

(52) U.S. Cl.
CPC ............ *A01C 7/205* (2013.01); *A01B 63/008* (2013.01); *A01C 7/203* (2013.01); *A01C 7/208* (2013.01)

(58) Field of Classification Search
CPC ......... A01C 7/205; A01C 7/203; A01C 7/208; A01C 7/201; A01C 7/20; A01C 7/00; A01B 63/008; A01B 63/002; A01B 63/00
See application file for complete search history.

(56) References Cited

U.S. PATENT DOCUMENTS

| | | | |
|---|---|---|---|
| 6,389,999 | B1 | 5/2002 | Duello |
| 8,188,385 | B2 | 5/2012 | Wolfgang et al. |
| 8,275,525 | B2 | 9/2012 | Kowalchuk et al. |
| 8,561,472 | B2 | 10/2013 | Sauder et al. |
| 8,738,243 | B2 | 5/2014 | Sander et al. |
| 9,144,189 | B2 | 9/2015 | Stoller et al. |
| 9,148,998 | B2 | 10/2015 | Bollin et al. |

(Continued)

FOREIGN PATENT DOCUMENTS

| | | |
|---|---|---|
| CA | 1254911 | 5/1989 |
| EP | 0372901 | 6/1990 |
| EP | 3476190 | 5/2019 |

OTHER PUBLICATIONS

Sharda et al., "Real-time Gauge Wheel Load Variability on Planter with Downforce Control During Field Operation," 13th International Conference on Precision Agriculture, Jul. 31-Aug. 4, 2016, 10 pgs, St. Louis, Missouri, USA.

*Primary Examiner* — Christopher J. Novosad
(74) *Attorney, Agent, or Firm* — Rebecca L. Henkel; Rickard K. DeMille

(57) ABSTRACT

A downforce monitoring system for an agricultural row unit includes a controller configured to receive a first input signal indicative of torque applied to a gauge wheel support arm. The controller is also configured to receive a second input signal indicative of an angle of the gauge wheel support arm relative to a frame of the agricultural row unit. In addition, the controller is configured to determine a determined downforce applied to a soil surface by a gauge wheel rotatably coupled to the gauge wheel support arm based on the torque and the angle. The controller is also configured to output a first output signal of the determined downforce, to output a second output signal to a downforce actuator to control a downforce applied to the soil surface by the gauge wheel based on the determined downforce and a target downforce, or a combination thereof.

20 Claims, 7 Drawing Sheets

(56) References Cited

U.S. PATENT DOCUMENTS

| | | |
|---|---|---|
| 9,221,659 B2 | 12/2015 | Fukasu et al. |
| 9,232,687 B2 | 1/2016 | Bassett |
| 9,288,937 B2 | 3/2016 | Sauder et al. |
| 9,433,142 B2 | 9/2016 | Bergen et al. |
| 9,968,030 B2 | 5/2018 | Kowalchuk et al. |
| 10,091,926 B2 | 10/2018 | Maro |
| 2018/0168094 A1* | 6/2018 | Koch .................... A01C 7/203 |

* cited by examiner

DOWNFORCE MONITORING SYSTEM FOR AN AGRICULTURAL ROW UNIT

BACKGROUND

The present disclosure relates generally to a downforce monitoring system for an agricultural row unit.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., positioned adjacent to the opener) is configured to deposit seeds into the trench. The opener/seed tube may be followed by a packer wheel that packs the soil on top of the deposited seeds.

Certain row units include a gauge wheel configured to control a penetration depth of the opener (e.g., opener disc) into the soil. For example, the row unit may include a depth adjustment handle configured to adjust a vertical position of the gauge wheel relative to a frame of the row unit. Because the opener is non-movably coupled to the frame and the gauge wheel is configured to contact the surface of the soil during operation of the row unit, controlling the vertical position of the gauge wheel adjusts the penetration depth of the opener into the soil. The downforce applied by the gauge wheel to the soil surface may be adjusted based on soil conditions, soil type, and/or seed type, among other factors. Accordingly, the implement may include a downforce actuator configured to adjust the downforce applied by the gauge wheel to the soil surface. In certain implements, the downforce actuator is manually controlled. Unfortunately, manually controlling the downforce actuator may cause the gauge wheel to apply a downforce to the soil surface that is higher or lower than a desired downforce (e.g., due to changing soil conditions throughout the field). If the downforce is higher than desired, the soil may be undesirably compacted. In addition, if the downforce is lower than desired, the gauge wheel may not contact the soil surface, thereby undesirably reducing the penetration depth of the opener (e.g., opener disc).

BRIEF DESCRIPTION

In certain embodiments, a downforce monitoring system for an agricultural row unit includes a controller having a processor and a memory. The controller is configured to receive a first input signal indicative of torque applied to a gauge wheel support arm about a pivot point of the gauge wheel support arm. The controller is also configured to receive a second input signal indicative of an angle of the gauge wheel support arm relative to a frame of the agricultural row unit. In addition, the controller is configured to determine a determined downforce applied to a soil surface by a gauge wheel rotatably coupled to the gauge wheel support arm based on the torque and the angle. The controller is also configured to output a first output signal indicative of the determined downforce, to output a second output signal to a downforce actuator to control a downforce applied to the soil surface by the gauge wheel based on the determined downforce and a target downforce, or a combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
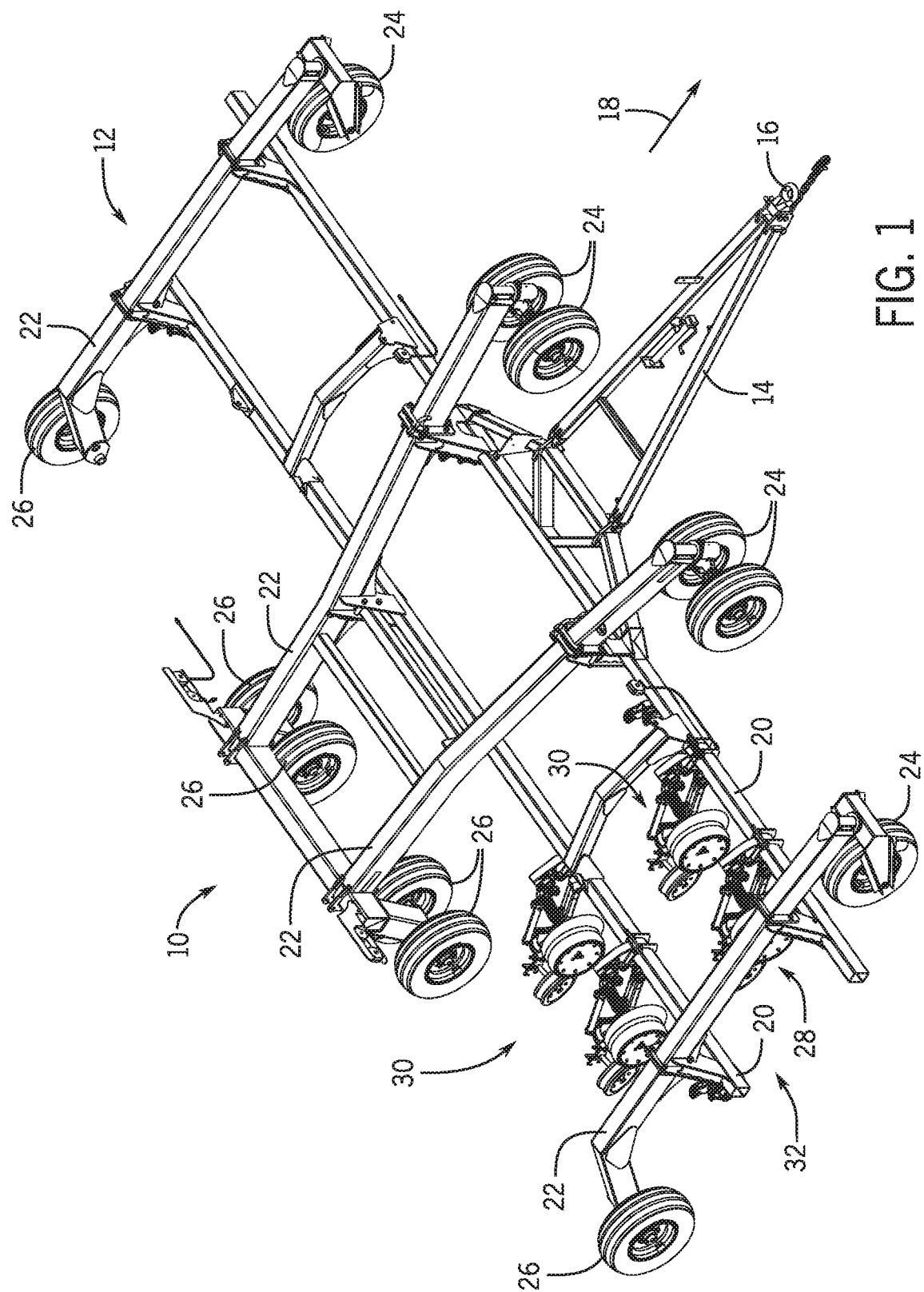
FIG. 1 is a perspective view of an embodiment of an agricultural implement having multiple row units.

FIG. 1 is a perspective view of an embodiment of an agricultural implement 10 having multiple row units. As illustrated, the agricultural implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor, etc.), thereby enabling the work vehicle to tow the agricultural implement 10 through a field along a direction of travel 18. While the illustrated tow bar 14 forms an A-frame, in certain embodiments, the tow bar may have any other suitable configuration (e.g., a single bar extending along the direction of travel, etc.). In addition, while the tow bar 14 is pivotally coupled to the frame 12 in the illustrated embodiment, in certain embodiments, the tow bar may be rigidly coupled to the frame. Furthermore, in certain embodiments, the hitch 16 may be coupled to a corresponding hitch of another implement (e.g., an air cart, etc.), and the other implement may be coupled to the work vehicle (e.g., via respective hitches). While the agricultural implement 10 is configured to be towed through the field by a work vehicle in the illustrated embodiment, in certain embodiments, the agricultural implement may be part of a self-propelled vehicle (e.g., in which the frame of the agricultural implement is coupled to a main frame/chassis of the self-propelled vehicle).

In the illustrated embodiment, the frame 12 of the agricultural implement 10 includes two toolbars 20 and four supports 22. As illustrated, wheels are coupled to the supports 22, and the supports 22 are coupled to the toolbars 20 (e.g., via fasteners, via a welded connection, etc.). In the illustrated embodiment, front wheel(s) 24 are rotatably coupled to a respective front portion of each support 22, and rear wheel(s) 26 are rotatably coupled to a respective rear portion of each support 22. The front portion of each support 22 is positioned forward of the respective rear portion relative to the direction of travel 18. The wheels maintain the supports 22 above the surface of the field and enable the agricultural implement 10 to move along the direction of travel 18. In the illustrated embodiment, pivotal connections between the front wheels 24 and the respective supports 22 enable the front wheels 24 to caster, thereby enhancing the turning ability of the agricultural implement 10 (e.g., at a headland, during transport, etc.). However, in certain embodiments, at least one front wheel may be non-pivotally coupled to the respective support, and/or at least one rear wheel may be pivotally coupled to the respective support. While the frame 12 of the agricultural implement 10 has four supports 22 in the illustrated embodiment, in certain embodiments, the agricultural implement may have more or fewer supports (e.g., 0, 1, 2, 3, 4, 5, 6, or more). Furthermore, in certain embodiments, the toolbars 20 of the frame 12 may be supported by other and/or additional suitable structures (e.g., connectors extending between toolbars, wheel mounts coupled to toolbars, etc.).

In the illustrated embodiment, a first row 28 of row units 30 is coupled to the front toolbar 20, and a second row 32 of row units 30 is coupled to the rear toolbar 20. While the agricultural implement 10 has two toolbars 20 and two corresponding rows of row units 30 in the illustrated embodiment, in other embodiments, the agricultural implement may include more or fewer toolbars (e.g., 1, 2, 3, 4, 5, 6, or more) and a corresponding number of rows of row units. Furthermore, while the agricultural implement 10 includes one type of row unit in the illustrated embodiment, in other embodiments, the agricultural implement may include multiple types of row units and/or other suitable agricultural tools (e.g., spray nozzle(s), finishing reel(s), tillage shank(s), etc.).

In the illustrated embodiment, each row unit 30 of the agricultural implement 10 is configured to deposit agricultural product (e.g., seed, fertilizer, etc.) into the soil. For example, certain row units 30 (e.g., all of the row units 30 of the agricultural implement 10, a portion of the row units 30 of the agricultural implement 10, at least one row unit 30 of the agricultural implement 10, etc.) include an opener (e.g., opener disc) configured to form a trench within the soil for agricultural product deposition into the soil. The row unit 30 also includes a gauge wheel (e.g., positioned adjacent to the opener) configured to control a penetration depth of the opener into the soil. For example, the opener may be non-movably coupled to a frame of the row unit, and the gauge wheel may be movably coupled to the frame and configured to contact a surface of the soil during operation of the row unit. Accordingly, adjusting the vertical position of the gauge wheel relative to the frame of the row unit controls the penetration depth of the opener into the soil. In addition, the row unit includes a product tube (e.g., seed tube) configured to deposit the agricultural product into the trench formed by the opener. In certain embodiments, the opener/agricultural product tube may be followed a packer assembly (e.g., including a packer wheel, etc.) that packs soil on top of the deposited agricultural product. In certain embodiments, each row unit 30 of the second row 32 is laterally offset (e.g., offset in a direction perpendicular to the direction of travel 18) from a respective row unit 30 of the first row 28, such that two adjacent rows of agricultural product are established within the soil. While the illustrated agricultural implement 10 includes two row units 30 in the first row 28 and two row units 30 in the second row 32 for illustrative purposes, the agricultural implement may have any suitable number of row units in the first row and any suitable number of row units in the second row. For example, the agricultural implement may include 5, 10, 15, 20, 25, or 30 row units in the first row and a corresponding number of row units in the second row. Furthermore, in certain embodiments, the second row may include more or fewer row units than the first row.

In certain embodiments, the agricultural implement and/or at least one row unit of the agricultural implement includes a downforce actuator configured to control a downforce applied by the gauge wheel to the soil surface. For example, in certain embodiments, the agricultural implement may include multiple downforce actuators each configured to control the downforce applied by the gauge wheels of a group of row units coupled to the downforce actuator. The downforce actuator may enable the downforce applied by the gauge wheel to the soil surface to be adjusted based on soil conditions, soil type, agricultural product type (e.g., seed type, fertilizer type, etc.), other suitable parameters, or a combination thereof. For example, the downforce may be reduced for moist soil conditions to reduce compaction, and the downforce may be increased for harder soil to enable the gauge wheel to maintain contact with the soil surface.

As discussed in detail below, the agricultural implement may include a downforce monitoring system configured to monitor and/or control the downforce applied by the gauge wheel of at least one row unit. In certain embodiments, the downforce monitoring system includes a controller configured to receive a first input signal indicative of torque applied to a gauge wheel support arm about a pivot axis of the gauge wheel support arm, in which the gauge wheel is rotatably coupled to the gauge wheel support arm. The controller is also configured to receive a second input signal indicative of an angle of the gauge wheel support arm relative to the frame of the agricultural row unit. In addition, the controller is configured to determine a determined downforce applied to the soil surface by the gauge wheel based on the torque and the angle. The controller is also configured to output a first output signal (e.g., to a user interface, to another controller, etc.) indicative of the determined downforce and/or to output a second output signal to the downforce actuator to control the downforce applied to the soil surface by the gauge wheel based on the determined downforce and a target downforce.

Because the controller utilizes the angle of the gauge wheel support arm relative to the frame to determine the determined downforce, the determined downforce may be significantly more accurate than a determined downforce based on the torque alone. For example, the determined downforce may be determined by dividing the torque by a horizontal component of the length of the gauge wheel support arm. The horizontal component may be determined based on the length of the gauge wheel support arm and the angle of the gauge wheel support arm relative to the frame. As the gauge wheel is moved along the vertical axis of the row unit to control the penetration depth of the opener into the soil, the horizontal component/angle varies. As a result, if a constant horizontal component/angle is used for determining the determined downforce, the determined downforce may be inaccurate due to the variation in the horizontal component/angle. Accordingly, utilizing the angle of the gauge wheel support arm relative to the frame to determine the determined downforce may result in a significantly more accurate determined downforce. As such, the downforce applied by the gauge wheel to the soil surface may be controlled more effectively, thereby reducing compaction and/or enabling the opener to maintain a target penetration depth during operation of the row unit.

Figure 2:
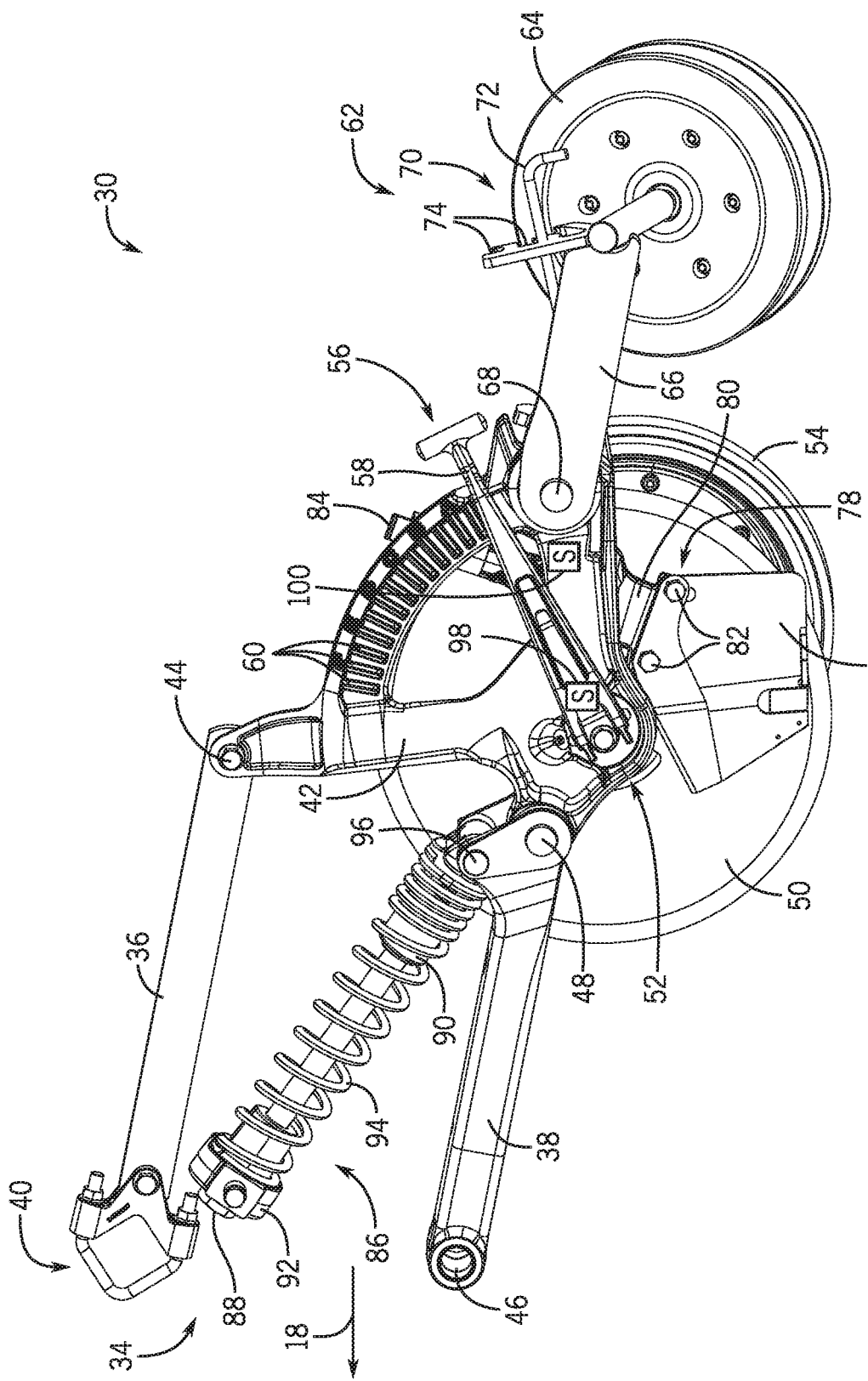
FIG. 2 is a perspective view of an embodiment of a row unit that may be employed within the agricultural implement of FIG. 1.

FIG. 2 is a perspective view of an embodiment of a row unit 30 (e.g., agricultural row unit) that may be employed within the agricultural implement of FIG. 1. In the illustrated embodiment, the row unit 30 includes a linkage assembly 34 configured to couple the row unit 30 to a respective toolbar of the agricultural implement. The linkage assembly 34 includes an upper link 36 and a lower link 38. A mount 40 is positioned at a first end of the upper link 36 and is configured to couple to the respective toolbar of the agricultural implement. In addition, a second end of the upper link 36 is coupled to a frame 42 of the row unit 30 by a fastener 44. The lower link 38 includes an opening 46 configured to receive a fastener that rotatably couples the lower link 38 to the respective toolbar. In addition, a second end of the lower link 38 is coupled to the frame 42 of the row unit by a fastener 48. The linkage assembly 34 enables the frame 42 of the row unit 30 to move vertically (e.g., raise and lower) relative to the respective toolbar (e.g., in response to obstructions or variations in the terrain, for raising the row unit frame for transport, etc.). While the linkage assembly includes 34 the upper link 36 and the lower link 38 in the illustrated embodiment, in other embodiments, the row unit may include any other suitable linkage configuration to facilitate vertical movement of the row unit frame relative to the respective toolbar.

In the illustrated embodiment, the row unit 30 includes a opener disc 50 rotatably and non-movably coupled to the frame 42 by a bearing assembly 52. The bearing assembly 52 enables the opener disc 50 to freely rotate as the opener disc engages the soil, thereby enabling the opener disc 50 to excavate a trench within the soil. While the row unit 30 includes an opener disc 50 in the illustrated embodiment, in other embodiments, the row unit may include another suitable opener (e.g., shank, point, etc.) configured to excavate a trench within the soil.

In the illustrated embodiment, the row unit 30 includes a gauge wheel 54 configured to control a penetration depth of the opener disc 50 into the soil. The gauge wheel 54 is configured to rotate along the surface of the soil. Accordingly, adjusting the vertical position of the gauge wheel 54 relative to the frame 42 controls the penetration depth of the opener disc 50 into the soil. As discussed in detail below, the gauge wheel 54 is rotatably coupled to a gauge wheel support arm, and the gauge wheel support arm is pivotally coupled to the frame 42. Accordingly, pivoting of the gauge wheel support arm drives the gauge wheel 54 to move vertically relative to the frame 42. In certain embodiments, the gauge wheel 54 is positioned against the opener disc 50 to remove soil from a side of the opener disc 50 during operation of the row unit 30.

The row unit 30 includes a depth adjustment assembly 56 configured to control the vertical position of the gauge wheel 54, thereby controlling the penetration depth of the opener disc 50 into the soil. In the illustrated embodiment, the depth adjustment assembly 56 includes a depth adjustment handle 58 and depth gauge notches 60. The depth adjustment handle 58 is non-rotatably coupled to the gauge wheel support arm and configured to drive the gauge wheel support arm to pivot about the pivot point, thereby controlling the vertical position of the gauge wheel 54 relative to the frame 42/opener disc 50. The depth adjustment handle 58 may be moved to any of the depth gauge notches 60 to adjust the vertical position of the gauge wheel 54. The depth gauge notches 60 block rotation of the depth adjustment handle 58, thereby maintaining the vertical position of the gauge wheel 54 (e.g., substantially fixing the position of the gauge wheel 54 relative to the frame 42). To adjust the vertical position of the gauge wheel 54/penetration depth of the opener disc 50, the depth adjustment handle 58 may be moved away from the depth gauge notches 60, thereby facilitating rotation of the depth adjustment handle 58 along the depth gauge notches 60. Upon release of the depth adjustment handle 58, a biasing member may urge the depth adjustment handle 58 to engage the depth gauge notches 60, thereby blocking rotation of the depth gauge handle 58 among the depth gauge notches 60. While the vertical position of the gauge wheel/penetration depth of the opener disc is controlled by the depth adjustment handle in the illustrated embodiment, in other embodiments, another suitable device, such as an actuator, may be used to control the vertical position of the gauge wheel/penetration depth of the opener disc.

In the illustrated embodiment, the row unit 30 includes a packer wheel assembly 62 having a packer wheel 64 and a support arm 66. The support arm 66 is rotatably coupled to the frame 42 by a fastener 68, and the packer wheel 64 is rotatably coupled to the support arm 66. The packer wheel 64 is configured to pack soil on top of the deposited agricultural product (e.g., to facilitate development of the resulting agricultural crop). The force applied by the packer wheel 64 to the soil surface may be adjusted via an adjustment assembly 70. The adjustment assembly 70 includes a torsion spring 72 configured to urge the support arm 66/packer wheel 64 toward the soil surface. An end of the torsion spring 72 may be moved between notches 74 to control the force applied by the packer wheel 64 to the soil surface. While the row unit includes the packer wheel assembly 62 in the illustrated embodiment, in other embodiments, the packer wheel assembly may be omitted.

In the illustrated embodiment, the row unit 30 includes a scraper 76 disposed adjacent to the opener disc 50 and configured to remove accumulated soil from the opener disc 50. As illustrated, a mounting portion 78 of the scraper 76 is rigidly coupled to a mounting bracket 80 by fasteners 82. In alternative embodiments, the scraper may be coupled directly to the frame, or the scraper may be mounted to another suitable mounting structure. In the illustrated embodiment, the mounting bracket 80 is pivotally coupled to the frame 42 by a shaft, and a biasing member urges the bracket 80/scraper 76 toward the opener disc 50, thereby facilitating debris removal. While the illustrated row unit includes a scraper, in other embodiments, the scraper may be omitted. Furthermore, the row unit 30 includes an agricultural product tube 84 (e.g., seed tube) configured to direct agricultural product into the trench formed by the opener disc 50.

The row unit 30 includes a spring assembly 86 configured to facilitate upward vertical movement of the row unit frame 42 (e.g., in response to contact between the opener disc 50 and an obstruction within the field). In the illustrated embodiment, the spring assembly 86 includes a bolt/tube assembly 88 that connects a lower trunnion 90 to an upper trunnion 92. The bolt/tube assembly 88 and lower trunnion 90 are surrounded by a compression spring 94. In addition, the spring assembly 86 is rotatably coupled to the lower link 38 by a fastener 96 to enable the spring assembly 86 to rotate relative to the lower link 38. In certain embodiments, a downforce actuator is configured to compress the spring assemblies of a group of row units. The force applied by the downforce actuator may be controlled to control the downforce applied by the gauge wheel 54 to the soil surface (e.g., while compressing the spring 94). In addition, the spring 94 is configured to compress to facilitate upward vertical movement of the frame 42 in response to the opener disc 50 or the gauge wheel 54 encountering an obstruction (e.g., rock, branch, etc.) within the field. While the row unit includes the spring assembly in the illustrated embodiment, in other embodiments, the spring assembly may be omitted. For example, in certain embodiments, the spring assembly may be omitted, and a downforce actuator may extend from the toolbar to the row unit (e.g., to the frame of the row unit, to a link of the linkage assembly, etc.).

As discussed in detail below, the agricultural implement may include a downforce monitoring system configured to monitor and/or control the downforce applied by the gauge wheel of the row unit. In certain embodiments, the downforce monitoring system includes a controller configured to receive a first input signal indicative of torque applied to the gauge wheel support arm about a pivot axis of the gauge wheel support arm. The controller is also configured to receive a second input signal indicative of an angle of the gauge wheel support arm relative to the frame of the agricultural row unit. In addition, the controller is configured to determine a determined downforce applied to the soil surface by the gauge wheel based on the torque and the angle. The controller is also configured to output a first output signal (e.g., to a user interface, to another controller, etc.) indicative of the determined downforce and/or to output a second output signal to the downforce actuator to control the downforce applied to the soil surface by the gauge wheel based on the determined downforce and a target downforce.

In the illustrated embodiment, the downforce monitoring system includes a torque sensor 98 (e.g., first sensor) mounted to the depth adjustment handle 58 and configured to be communicatively coupled to the controller. The torque sensor 98 is configured to output the first input signal to the controller indicative of the torque applied to the gauge wheel support arm about the pivot point. For example, the torque sensor 98 may include a strain gauge configured to output the first input signal based on bending of the depth adjustment handle 58. As previously discussed, the depth adjustment handle 58 is non-rotatably coupled to the gauge wheel support arm and configured to drive the gauge wheel support arm to rotate about the pivot point, thereby controlling the vertical position of the gauge wheel 54 relative to the frame 42/opener disc 50. In addition, the downforce applied by the gauge wheel 54 to the soil surface urges the gauge wheel support arm to rotate about the pivot point. Due to the non-rotatable coupling between the gauge wheel support arm and the depth adjustment handle 58, the downforce urges the depth adjustment handle 58 to rotate. However, as previously discussed, rotation of the depth adjustment handle 58 is blocked by the depth gauge notches 60 (e.g., while the depth adjustment handle 58 is engaged with the depth gauge notches 60). Accordingly, the downforce causes a torque to be applied to the gauge wheel support arm, and the downforce induces a bending moment within the depth adjustment handle 58. As a result, by monitoring the bending of the depth adjustment handle 58, the torque sensor 98 may output the first single indicative of the torque applied to the gauge wheel support arm about the pivot point. While the torque sensor includes a strain gauge coupled to the depth adjustment handle in the illustrated embodiment, in other embodiments, the torque sensor may include any other suitable device configured to output the first input signal indicative of the torque applied to the gauge wheel support arm (e.g., a torque sensing device at the pivot joint, a strain gauge coupled to the gauge wheel support arm, etc.).

In the illustrated embodiment, the downforce monitoring system includes an angle sensor 100 (e.g., second sensor) mounted to the frame 42 of the row unit 30 and configured to be communicatively coupled to the controller. The angle sensor 100 is configured to output the second input signal to the controller indicative of an angle of the gauge wheel support arm relative to the frame 42. For example, the angle sensor 100 may include a non-contact sensor (e.g., one or more optical sensors, one or more inductance sensors, one or more capacitance sensors, etc.) configured to monitor the orientation of the depth adjustment handle 58. As previously discussed, the depth adjustment handle 58 is non-rotatably coupled to the gauge wheel support arm. Accordingly, by monitoring the orientation of the depth adjustment handle 58, the angle sensor 100 may output the second input signal indicative of the angle of the gauge wheel support arm relative to the frame 42. Furthermore, in certain embodiments, the angle sensor may include a non-contact sensor (e.g., one or more optical sensors, one or more inductance sensors, one or more capacitance sensors, etc.) configured to monitor the orientation of the gauge wheel support arm directly. In addition, in certain embodiments, the angle sensor may include a contact sensor (e.g., potentiometer, linear variable differential transformer (LVDT), etc.) coupled to the gauge wheel support arm and/or the depth adjustment handle 58 and configured to output the second input signal indicative of the angle of the gauge wheel support arm relative to the frame.

Figure 3:
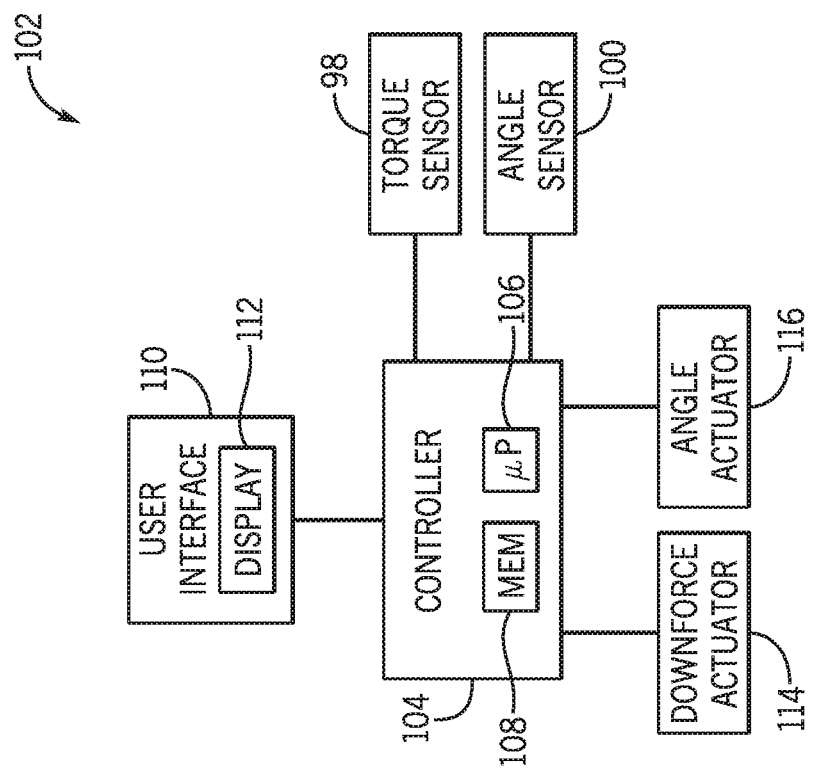
FIG. 3 is a schematic view of an embodiment of a downforce monitoring system that may be utilized with the row unit of FIG. 2.

FIG. 3 is a schematic view of an embodiment of a downforce monitoring system 102 that may be utilized with the row unit of FIG. 2. In the illustrated embodiment, the downforce monitoring system 102 includes a controller 104 communicatively coupled to the torque sensor 98 and the angle sensor 100. In certain embodiments, the controller 104 is an electronic controller having electrical circuitry configured to receive respective signals from the torque sensor 98 and the angle sensor 100. In the illustrated embodiment, the controller 104 includes a processor, such as the illustrated microprocessor 106, and a memory device 108. The controller 104 may also include one or more storage devices and/or other suitable components. The processor 106 may be used to execute software, such as software for determining a determined downforce applied to the soil surface by the gauge wheel, and so forth. Moreover, the processor 106 may include multiple microprocessors, one or more "general-purpose" microprocessors, one or more special-purpose microprocessors, and/or one or more application specific integrated circuits (ASICS), or some combination thereof.

For example, the processor 106 may include one or more reduced instruction set (RISC) processors.

The memory device 108 may include a volatile memory, such as random access memory (RAM), and/or a nonvolatile memory, such as read-only memory (ROM). The memory device 108 may store a variety of information and may be used for various purposes. For example, the memory device 108 may store processor-executable instructions (e.g., firmware or software) for the processor 106 to execute, such as instructions for determining the determined downforce, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., a gauge wheel support arm angle/penetration depth calibration, a length of the gauge wheel support arm, etc.), instructions (e.g., software or firmware for determining the determined downforce, etc.), and any other suitable data.

In the illustrated embodiment, the torque sensor 98 (e.g., first sensor) and the angle sensor 100 (e.g., second sensor) are communicatively coupled to the controller 104. As previously discussed, the torque sensor 98 is configured to output a first input signal to the controller 104 indicative of torque applied to the gauge wheel support arm about the pivot point of the gauge wheel support arm. For example, the torque sensor 98 may be coupled to the depth adjustment handle, which is non-rotatably coupled to the gauge wheel support arm. In addition, the angle sensor 100 is configured to output a second input signal to the controller 104 indicative of the angle of the gauge wheel support arm relative to the frame of the agricultural row unit. For example, the angle sensor 100 may include a non-contact sensor (e.g., one or more optical sensors, one or more inductance sensors, one or more capacitance sensors, etc.) configured to monitor the orientation of the depth adjustment handle.

The controller 104 is configured to receive the first input signal and the second input signal and to determine a determined downforce applied to the soil surface by the gauge wheel based on the torque applied to the gauge wheel support arm about the pivot point and the angle of the gauge wheel support arm relative to the row unit frame. For example, in certain embodiments, the controller is configured to determine a horizontal offset between the pivot point of the gauge wheel support arm and a rotation axis of the gauge wheel based on the angle of the gauge wheel support arm relative to the row unit frame and a length of the gauge wheel support arm (e.g., the distance between the gauge wheel support arm pivot point and the gauge wheel rotation axis). In such embodiments, the controller 104 may determine the determined downforce applied to the soil surface by the gauge wheel based on the torque applied to the gauge wheel support arm about the pivot point and the horizontal offset. For example, the controller may determine the determined downforce by dividing the torque by the horizontal offset.

In certain embodiments, the controller 104 is configured to store the length of the gauge wheel support arm for multiple row unit configurations (e.g., within the storage device). In such embodiments, the controller 104 may load a gauge wheel support arm length corresponding to the row unit currently mounted to the agricultural implement frame and utilize the loaded gauge wheel support arm length for determining the horizontal offset. For example, the controller may identify the row unit type/configuration based on a signal (e.g., identification signal) from an implement controller and/or a row unit controller (e.g., communicatively coupled to the controller via a CAN bus or other suitable connection) and load the gauge wheel support arm length corresponding to the identified row unit type/configuration. In addition or alternatively, the row unit type/configuration may be manually input into a user interface. Furthermore, in certain embodiments, the length of the gauge wheel support arm may be manually entered into the user interface (e.g., if the gauge wheel support arm length for the identified row unit is not stored within the controller). In certain embodiments, the length of the gauge wheel support arm may be received by the controller via a signal output by the implement controller and/or the row unit controller.

In response to determining the determined downforce, the controller 104 may output a first output signal to a user interface 110 of the downforce monitoring system 102 indicative of the determined downforce. In the illustrated embodiment, the user interface 110 is communicatively coupled to the controller 104 and includes a display 112. Upon receipt of the first output signal from the controller 104, the user interface 110 may present a graphic and/or numerical representation of the determined downforce on the display 112. Accordingly, an operator may identify the downforce by viewing the display 112.

In addition, in response to determining the downforce, the controller 104 may output a second output signal to a downforce actuator 114 (e.g., first actuator) of the downforce monitoring system 102 to control a downforce applied to the soil surface by the gauge wheel. In the illustrated embodiment, the downforce actuator 114 is communicatively coupled to the controller and configured to control the downforce applied to the soil surface by the gauge wheel. For example, in certain embodiments, the downforce actuator may extend from the toolbar of the agricultural implement to the frame/link of the row unit. In further embodiments, the downforce actuator may extend from the toolbar to a transverse member coupled to multiple row units (e.g., the spring assemblies of multiple row units). The downforce actuator may include a hydraulic actuator, a pneumatic actuator, an electromechanical actuator, another suitable type of actuator, or a combination thereof. In certain embodiments, the downforce actuator includes a fluid actuator (e.g., hydraulic actuator, pneumatic actuator, etc.) controlled by a fluid flow and a valve assembly configured to control the fluid flow to the fluid actuator. The downforce actuator is configured to urge the gauge wheel of the row unit against the soil surface.

In certain embodiments, the controller 104 is configured to output the second output signal to the downforce actuator 114 to control the downforce based on the determined downforce and a target downforce. The target downforce may be stored within the controller 104 (e.g., within the storage device), determined by the controller 104 (e.g., based on a soil condition map of the field, a yield map of the field, a soil type map of the field, agricultural product type, agricultural product flow rate, other suitable parameter(s), or a combination thereof), or manually input via the user interface 110 (e.g., via a touch screen interface of the display 112). In certain embodiments, the controller 104 may instruct the downforce actuator 114 to increase or decrease the downforce such that the determined downforce is within a threshold range of the target downforce. As a result, undesirable soil compaction from the gauge wheel may be reduced and/or the penetration depth of the opener disc may be substantially maintained.

In certain embodiments, the user interface 110 is configured to receive an input from the operator (e.g., via a touch screen interface of the display 112) indicative of a penetration depth of the opener disc into the soil. In response to receiving the input indicative of the penetration depth, the user interface 110 may output the second input signal to the controller 104 based on the input. The controller 104 may then determine the angle of the gauge wheel support arm relative to the frame of the row unit based on the penetration depth of the opener disc into the soil and a gauge wheel support arm angle/penetration depth calibration. In certain embodiments, the gauge wheel support arm angle/penetration depth calibration may be based at least in part on the length of the gauge wheel support arm. The calibration may include a table that lists multiple penetration depths and corresponding gauge wheel support arm angles, an empirical equation that relates the penetration depth to the gauge wheel support arm angle, another suitable relationship between the gauge wheel support arm angle and the penetration depth of the opener disc, or a combination thereof. Because the second input signal indicative of the angle of the gauge wheel support arm relative to the frame may be received from the user interface or the angle sensor, the user interface or the angle sensor may be omitted in certain embodiments.

In certain embodiments, the controller 104 is configured to store the gauge wheel support arm angle/penetration depth calibration for multiple row unit configurations (e.g., within the storage device). In such embodiments, the controller 104 may load a calibration corresponding to the row unit currently mounted to the agricultural implement frame and utilize the loaded calibration for determining the angle of the gauge wheel support arm relative to the row unit frame. For example, the controller may identify the row unit type/configuration based on a signal (e.g., identification signal) from an implement controller and/or a row unit controller (e.g., communicatively coupled to the controller via a CAN bus or other suitable connection) and load the gauge wheel support arm angle/penetration depth calibration corresponding to the identified row unit type/configuration. In addition or alternatively, the row unit type/configuration may be manually input into the user interface 110 (e.g., via a touch screen interface of the display 112). In certain embodiments, the gauge wheel support arm angle/penetration depth calibration may be manually entered into the user interface (e.g., if the calibration for the identified row unit is not stored within the controller). Furthermore, in certain embodiments, the gauge wheel support arm angle/penetration depth calibration may be received by the controller via a signal output by the implement controller and/or the row unit controller.

While inputting the penetration depth of the opener disc into the user interface is disclosed above, in certain embodiments, the downforce monitoring system may include a penetration depth sensor configured to output the second input signal to the controller. For example, a penetration depth sensor may be mounted to the frame of the row unit and configured to monitor the distance between the row unit frame and the soil surface. The penetration depth sensor may include a contact sensor. For example, the contact sensor may include an arm extending from the row unit frame and configured to contact the soil surface. The contact sensor may also include an angle sensor (e.g., a potentiometer coupled to the row unit frame and to the arm) configured to monitor the angle of the arm. In addition or alternatively, the penetration depth sensor may include a non-contact sensor, such as a proximity sensor, an ultrasonic sensor, or an infrared sensor, configured to monitor the distance between the row unit frame and the soil surface. The penetration depth sensor may output the second input signal to the controller, and the controller may determine the angle of the gauge wheel support arm relative to the frame of the row unit based on the penetration depth of the opener disc into the soil and the gauge wheel support arm angle/penetration depth calibration.

In certain embodiments, the downforce monitoring system 102 includes an angle actuator 116 (e.g., second actuator) configured to control the angle of the gauge wheel support arm relative to the frame of the row unit. In such embodiments, the angle actuator 116 is communicatively coupled to the controller 104. The angle actuator may include a hydraulic actuator, a pneumatic actuator, an electromechanical actuator, another suitable type of actuator, or a combination thereof (e.g., extending from the gauge wheel support arm to the frame of the row unit). In certain embodiments, the downforce actuator includes a fluid actuator (e.g., hydraulic actuator, pneumatic actuator, etc.) controlled by a fluid flow and a valve assembly configured to control the fluid flow to the fluid actuator. The controller 104 may output a third output signal to the angle actuator 116 to control the angle of the gauge wheel support arm relative to the row unit frame based on a target penetration depth of the opener into the soil (e.g., as input via the user interface 110) and the gauge wheel support arm angle/penetration depth calibration. For example, an operator may input the target penetration depth into the user interface 110 and, in response, the user interface 110 may output a third input signal to the controller 104 indicative of the target penetration depth. The controller 104 may then determine a target angle of the gauge wheel support arm relative to the row unit frame based on the target penetration depth and the calibration, and the controller may output the third output signal to the angle actuator to control the angle of the gauge wheel support arm relative to the row unit frame based on the target penetration depth and the calibration. Once the controller 104 determines that the gauge wheel support arm is orientated at (e.g., within a threshold range of) the target angle (e.g., based on the second input signal from the angle sensor 100), the controller may determine the determined downforce applied to the soil surface by the gauge wheel based on the angle (e.g., received by the controller via the second input signal from the angle sensor 100) and the torque (e.g., received by the controller via the first input signal output by the torque sensor 98).

In certain embodiments, the controller may determine the target penetration depth of the opener disc (e.g., without direct operator input). For example, the controller may receive data indicative of a soil condition map of the field, a yield map of the field, a soil type map of the field, a type of agricultural product being disposed within the soil, a flow rate of the agricultural product, other suitable parameter(s), or a combination thereof. The controller may then determine the target penetration depth of the opener disc based on the data. As discussed above, the controller may then determine a target angle of the gauge wheel support arm relative to the row unit frame based on the target penetration depth and the calibration, and the controller may output the third output signal to the angle actuator to control the angle of the gauge wheel support arm relative to the row unit frame based on the target penetration depth and the calibration.

Figure 4:
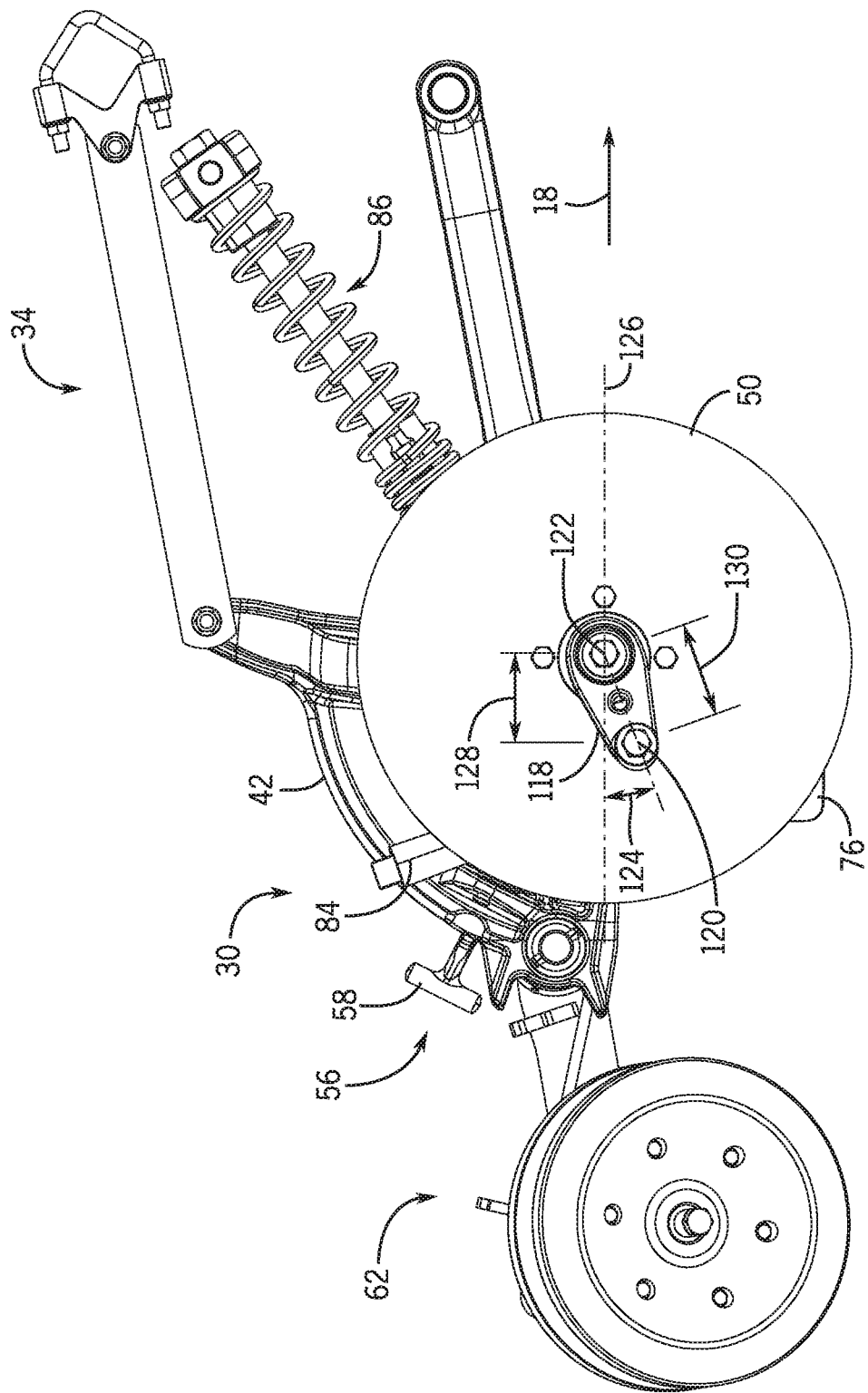
FIG. 4 is a side view of a portion of the row unit of FIG. 2, in which an opener disc is in a minimum depth position.

FIG. 4 is a side view of a portion of the row unit 30 of FIG. 2, in which the opener disc 50 is in a minimum depth position. As previously discussed, the gauge wheel engages the surface of the soil and controls the penetration depth of the opener disc 50 into the soil. With the gauge wheel in a minimum depth position relative to the frame 42 of the row unit 30, the opener disc 50 is in the illustrated minimum depth position, thereby establishing a shallow penetration depth into the soil. The gauge wheel is configured to be rotatably coupled to the gauge wheel support arm 118 and to rotate about a rotation axis 120. In addition, the gauge wheel support arm 118 is pivotally coupled to the frame 42 and configured to pivot relative to the frame 42 about a pivot point 122. As previously discussed, the gauge wheel support arm 118 is non-rotatably coupled to the depth adjustment handle 58. As a result, the depth adjustment handle 58 may drive the gauge wheel support arm 118 to rotate about the pivot point 122, thereby controlling the vertical position of the rotation axis 120 of the gauge wheel, which controls the penetration depth of the opener disc 50 into the soil.

As the gauge wheel support arm 118 is driven to rotate, the angle 124 of the gauge wheel support arm 118 relative to the frame 42 varies. In the illustrated embodiment, the angle 124 is measured relative to a horizontal axis 126 of the row unit 30. However, in other embodiments, the angle may be measured relative to any suitable reference line. For example, in certain embodiments, the reference line may extend half way between a first orientation of the gauge wheel support arm while the gauge wheel is in the maximum depth position and a second orientation of the gauge wheel support arm while the gauge wheel is in the minimum depth position. As previously discussed, the controller is configured to receive the second input signal indicative of the angle 124 of the gauge wheel support arm 118 relative to the frame 42 and to determine the determined downforce based on the angle 124 and the torque applied to the gauge wheel support arm 118 about the pivot point 122.

In certain embodiments, the controller is configured to determine a horizontal offset 128 between the pivot point 122 of the gauge wheel support arm 118 and the rotation axis 120 of the gauge wheel (e.g., the distance between the pivot point 122 and the rotation axis 120 along the horizontal axis 126) based on the angle 124 and a length 130 of the gauge wheel support arm 118. As used herein, "length of the gauge wheel support arm" refers to the distance between the pivot point of the gauge wheel support arm and the rotation axis of the gauge wheel. In certain embodiments, the controller is configured to determine the determined downforce applied to the soil surface by the gauge wheel based on the torque applied to the gauge wheel support arm 118 about the pivot point 122 and the horizontal offset 128. For example, the controller may determine the determined downforce by dividing the torque by the horizontal offset.

Figure 5:
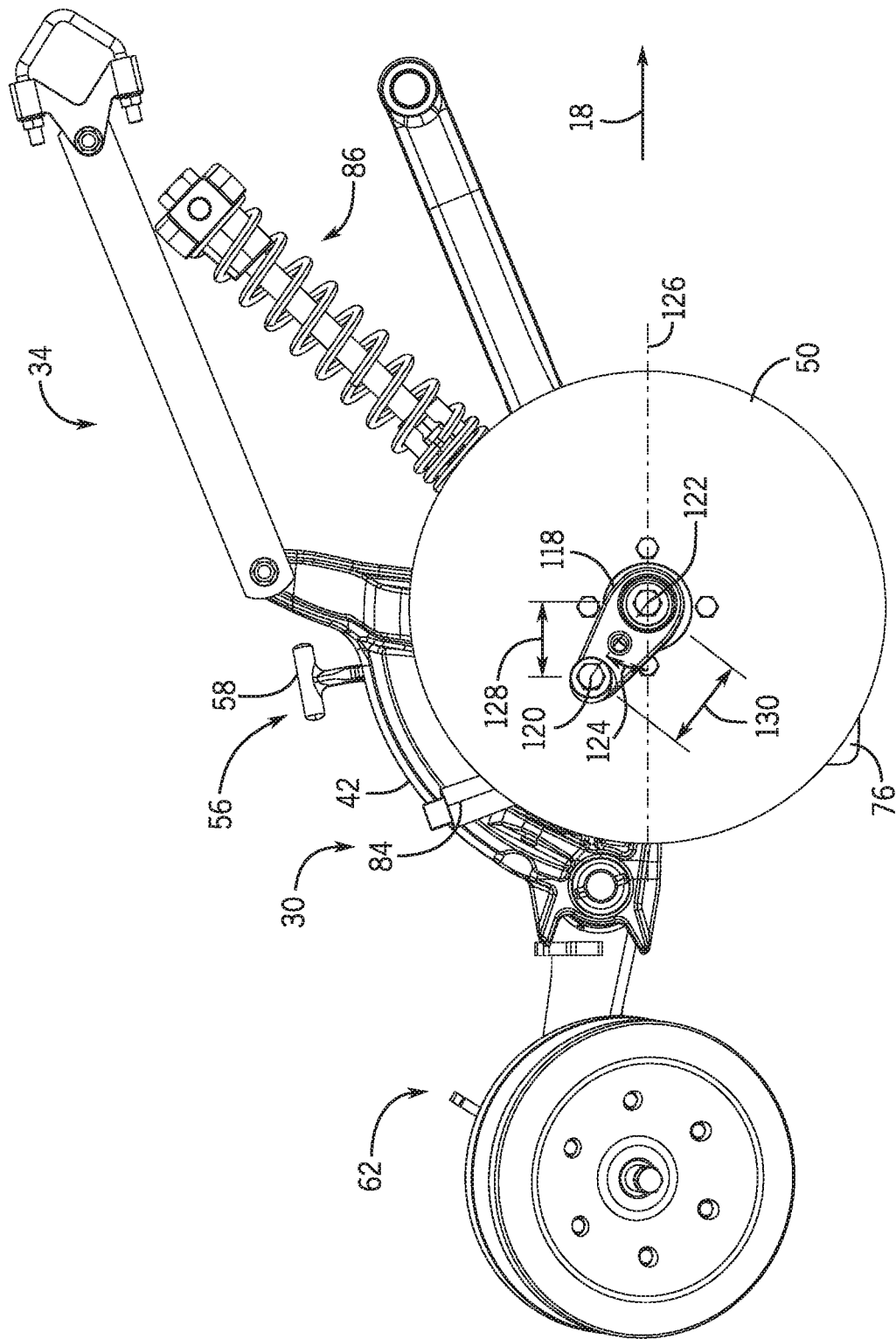
FIG. 5 is a side view of a portion of the row unit of FIG. 2, in which the opener disc is in a maximum depth position.

FIG. 5 is a side view of a portion of the row unit 30 of FIG. 2, in which the opener disc 50 is in a maximum depth position. As previously discussed, the gauge wheel engages the surface of the soil and controls the penetration depth of the opener disc 50 into the soil. With the gauge wheel in a maximum depth position relative to the frame 42 of the row unit 30, the opener disc 50 is in the illustrated maximum depth position, thereby establishing a greater penetration depth into the soil (e.g., as compared to the penetration depth of the opener disc of FIG. 4). Accordingly, the angle 124 of the gauge wheel support arm 118 relative to the frame 42 is different than the angle shown in FIG. 4. As such, the downforce applied by the gauge wheel to the soil surface may be different than the downforce applied by the gauge wheel of FIG. 4 even if the torque applied to the gauge wheel support arm is the same. Because the controller utilizes the angle of the gauge wheel support arm relative to the frame to determine the determined downforce, the determined downforce may be significantly more accurate than a determined downforce based on the torque alone. As a result, the downforce applied by the gauge wheel to the soil surface may be controlled more effectively, thereby reducing compaction and/or enabling the opener to maintain a target penetration depth during operation of the row unit.

Figure 6:
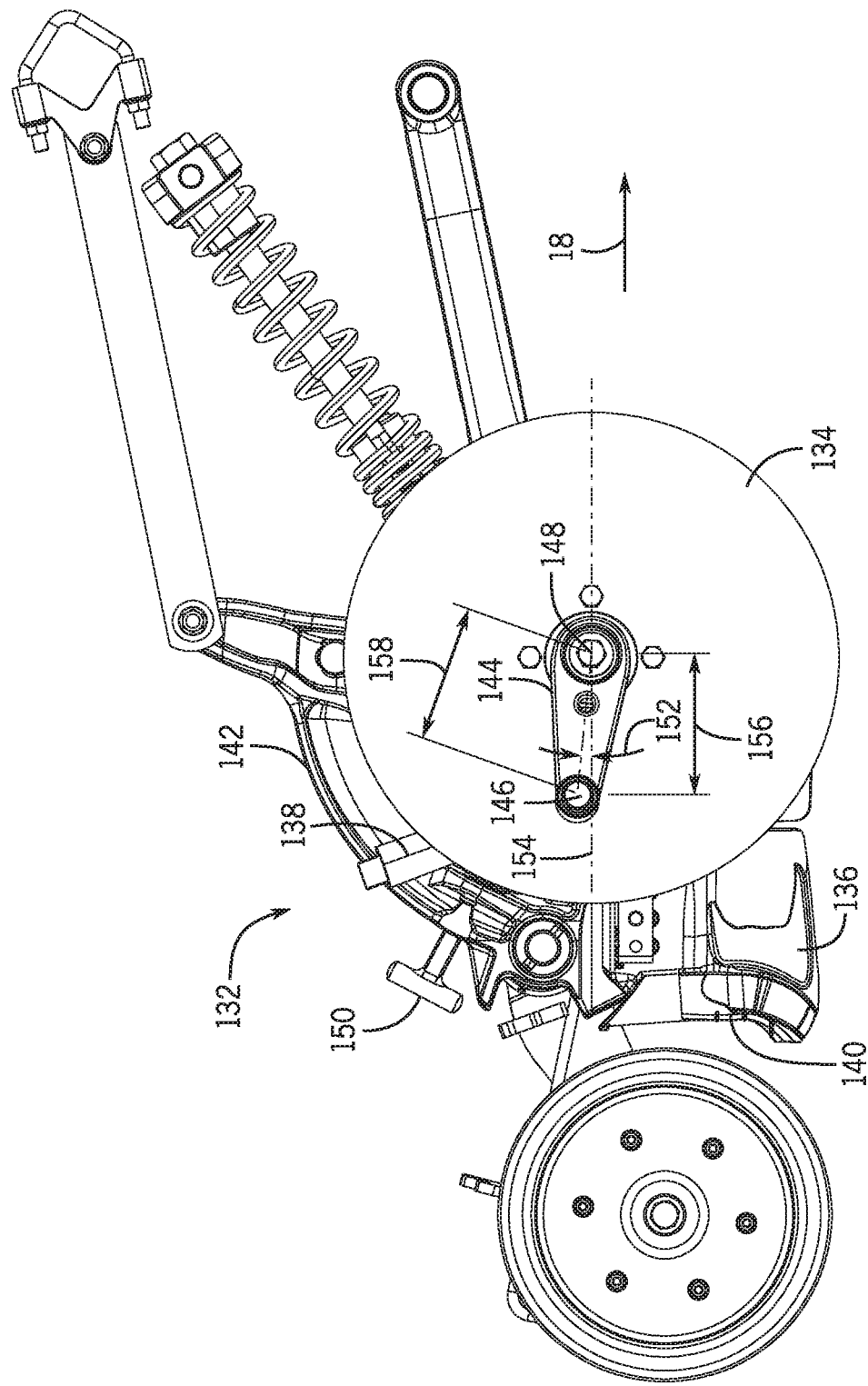
FIG. 6 is a side view of a portion of another embodiment of a row unit, in which an opener disc is in a minimum depth position.

FIG. 6 is a side view of a portion of another embodiment of a row unit 132, in which an opener disc 134 is in a minimum depth position. In the illustrated embodiment, the row unit 132 includes a second opener 136 configured to facilitate deposition of a second agricultural product into the soil. Similar to the row unit described above with reference to FIGS. 2 and 4-5, the opener disc 134 is configured to excavate a trench within the soil. The second opener 136 is configured to excavate a groove within a side wall of the trench. An agricultural product tube 138 positioned adjacent to the opener disc 134 is configured to deposit a first agricultural product (e.g., fertilizer) at the bottom of the trench, and a passage 140 within the second opener 136 is configured to deposit a second agricultural product (e.g., seed) within the side wall groove.

Similar to the row unit described above with reference to FIGS. 2 and 4-5, the gauge wheel engages the surface of the soil and controls the penetration depth of the opener disc 134 into the soil. With the gauge wheel in a minimum depth position relative to the frame 142 of the row unit 132, the opener disc 134 is in the illustrated minimum depth position, thereby establishing a shallow penetration depth into the soil. The gauge wheel is configured to be rotatably coupled to the gauge wheel support arm 144 and to rotate about a rotation axis 146. In addition, the gauge wheel support arm 144 is pivotally coupled to the frame 142 and configured to pivot relative to the frame 142 about a pivot point 148. The gauge wheel support arm 144 is non-rotatably coupled to the depth adjustment handle 150. As a result, the depth adjustment handle 150 may drive the gauge wheel support arm 144 to rotate about the pivot point 148, thereby controlling the vertical position of the rotation axis 146 of the gauge wheel, which controls the penetration depth of the opener disc 134 into the soil.

As the gauge wheel support arm 144 is driven to rotate, the angle 152 of the gauge wheel support arm 144 relative to the frame 142 varies. In the illustrated embodiment, the angle 152 is measured relative to a horizontal axis 154 of the row unit 132. However, in other embodiments, the angle may be measured relative to any suitable reference line. For example, in certain embodiments, the reference line may extend half way between a first orientation of the gauge wheel support arm while the gauge wheel is in the maximum depth position and a second orientation of the gauge wheel support arm while the gauge wheel is in the minimum depth position. The controller is configured to receive the second input signal indicative of the angle 152 of the gauge wheel support arm 144 relative to the frame 142 and to determine the determined downforce based on the angle 152 and the torque applied to the gauge wheel support arm 144 about the pivot point 148.

In certain embodiments, the controller is configured to determine a horizontal offset 156 between the pivot point 148 of the gauge wheel support arm 144 and the rotation axis 146 of the gauge wheel (e.g., the distance between the pivot point 148 and the rotation axis 146 along the horizontal axis 154) based on the angle 152 and a length 158 of the gauge wheel support arm 144. In the illustrated embodiment, the length 158 of the gauge wheel support arm 144 corresponds to the distance between the pivot point 148 of the gauge wheel support arm 144 and the rotation axis 146 of the gauge wheel. In certain embodiments, the controller is configured to determine the determined downforce applied to the soil surface by the gauge wheel based on the torque applied to the gauge wheel support arm 144 about the pivot point 148 and the horizontal offset 156. For example, the controller may determine the determined downforce by dividing the torque by the horizontal offset.

In certain embodiments, the controller is configured to store the length of the gauge wheel support arm for multiple row unit configurations (e.g., within the storage device). For example, the length 158 of the gauge wheel support arm 144 in the illustrated embodiment is greater than the length of the gauge wheel support arm in the embodiment of the row unit disclosed above with reference to FIGS. 2 and 4-5. As such, the controller may store the lengths of both gauge wheel support arms and associate the length of each gauge wheel support arm with a respective row unit type/configuration. The controller may then load a gauge wheel support arm length corresponding to the row unit currently mounted to the agricultural implement frame and utilize the loaded gauge wheel support arm length for determining the horizontal offset. For example, the controller may identify the row unit based on a signal from an implement controller and/or a row unit controller and load the gauge wheel support arm length corresponding to the identified row unit. In addition or alternatively, the row unit type may be manually input into a user interface. In certain embodiments, the length of the gauge wheel support arm may be manually entered into a user interface (e.g., if the gauge wheel support arm length for the identified row unit is not stored within the controller).

In certain embodiments, the user interface is configured to receive an input from the operator (e.g., via a touch screen interface of the display) indicative of a penetration depth of the opener disc into the soil. In response to receiving the input indicative of the penetration depth, the user interface may output the second input signal to the controller based on the input. For example, the controller may determine the angle of the gauge wheel support arm relative to the frame of the row unit based on the penetration depth of the opener disc into the soil and a gauge wheel support arm angle/penetration depth calibration. The calibration may include a table that lists multiple penetration depths and corresponding gauge wheel support arm angles, an empirical equation that relates the penetration depth to the gauge wheel support arm angle, another suitable relationship between the gauge wheel support arm angle and the penetration depth of the opener disc, or a combination thereof.

In certain embodiments, the controller is configured to store the gauge wheel support arm angle/penetration depth calibration for multiple row unit configurations (e.g., within the storage device). For example, the controller may store a first gauge wheel support arm angle/penetration depth calibration for the row unit disclosed above with reference to FIGS. 2 and 4-5, and the controller may store a second gauge wheel support arm angle/penetration depth calibration for the illustrated row unit. The controller may then load a calibration corresponding to the row unit currently mounted to the agricultural implement frame and utilize the loaded calibration for determining the angle of the gauge wheel support arm relative to the row unit frame. For example, the controller may identify the row unit based on a signal from an implement controller and/or a row unit controller and load the gauge wheel support arm angle/penetration depth calibration corresponding to the identified row unit. In addition or alternatively, the row unit type/configuration may be manually input into the user interface (e.g., via a touch screen interface of the display). In certain embodiments, the gauge wheel support arm angle/penetration depth calibration may be manually entered into a user interface (e.g., if the calibration for the identified row unit is not stored within the controller).

Figure 7:
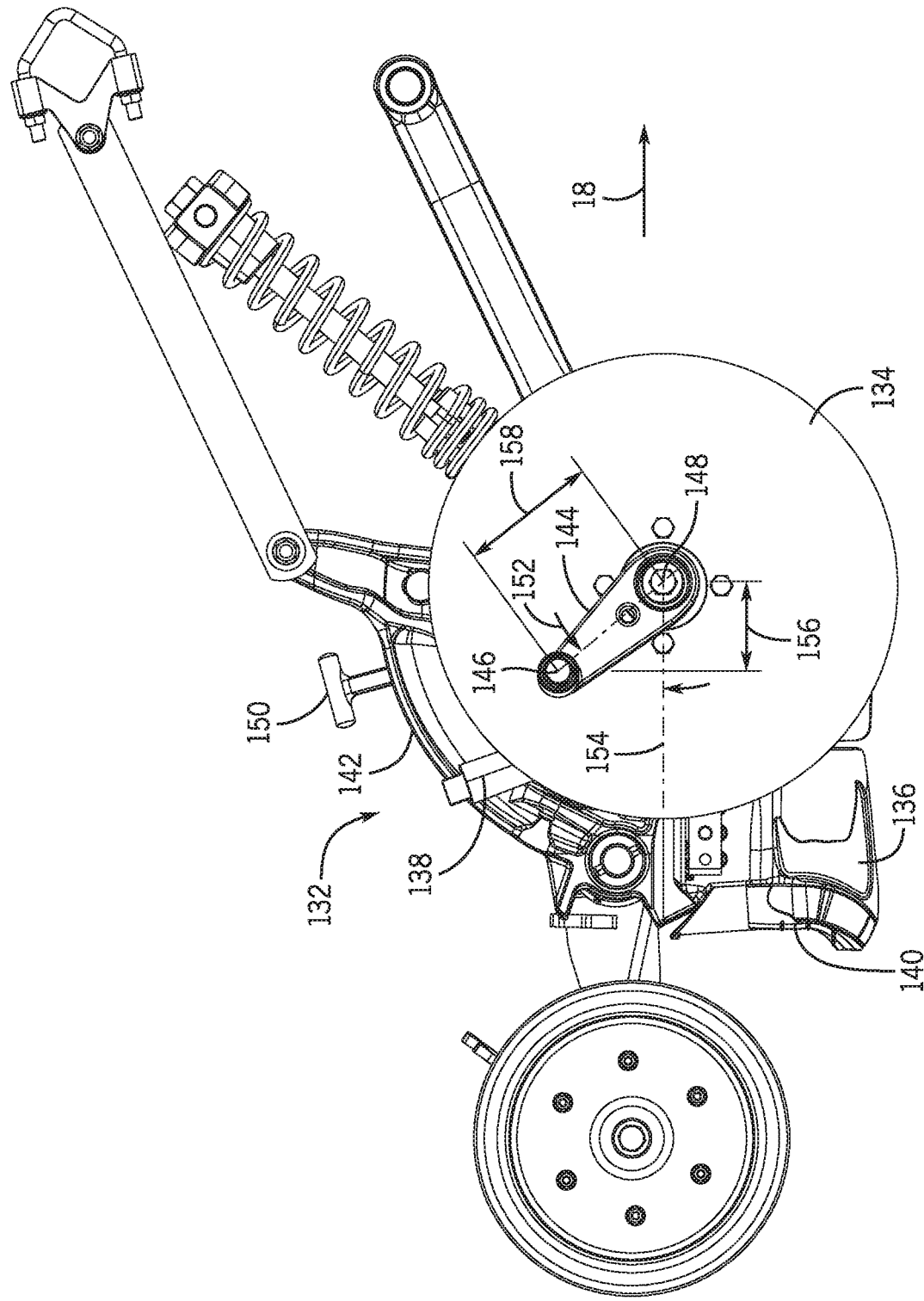
FIG. 7 is a side view of a portion of the row unit of FIG. 6, in which the opener disc is in a maximum depth position.

FIG. 7 is a side view of a portion of the row unit of FIG. 6, in which the opener disc 134 is in a maximum depth position. As previously discussed, the gauge wheel engages the surface of the soil and controls the penetration depth of the opener disc 134 into the soil. With the gauge wheel in a maximum depth position relative to the frame 142 of the row unit 132, the opener disc 134 is in the illustrated maximum depth position, thereby establishing a greater penetration depth into the soil (e.g., as compared to the penetration depth of the opener disc of FIG. 6). Accordingly, the angle 152 of the gauge wheel support arm 144 relative to the frame 142 is different than the angle shown in FIG. 6. As such, the downforce applied by the gauge wheel to the soil surface may be different than the downforce applied by the gauge wheel of FIG. 6 even if the torque applied to the gauge wheel support arm is the same. Because the controller utilizes the angle of the gauge wheel support arm relative to the frame to determine the determined downforce, the determined downforce may be significantly more accurate than a determined downforce based on the torque alone. As a result, the downforce applied by the gauge wheel to the soil surface may be controlled more effectively, thereby reducing compaction and/or enabling the opener to maintain a target penetration depth during operation of the row unit. While the downforce monitoring system is described above with reference to a single row unit, in certain embodiments, the downforce monitoring system may be utilized to monitor and/or control the downforce applied by the gauge wheels of multiple row units.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A downforce monitoring system for an agricultural row unit, comprising:
a controller comprising a processor and a memory, wherein the controller is configured to:
receive a first input signal indicative of torque applied to a gauge wheel support arm about a pivot point of the gauge wheel support arm;
receive a second input signal indicative of an angle of the gauge wheel support arm relative to a frame of the agricultural row unit;
determine a determined downforce applied to a soil surface by a gauge wheel rotatably coupled to the gauge wheel support arm based on the torque and the angle; and
output a first output signal indicative of the determined downforce, output a second output signal to a downforce actuator to control a downforce applied to the soil surface by the gauge wheel based on the determined downforce and a target downforce, or a combination thereof.

2. The downforce monitoring system of claim 1, comprising a first sensor communicatively coupled to the controller, wherein the first sensor is configured to couple to a depth adjustment handle non-rotatably coupled to the gauge wheel support arm, and the first sensor is configured to output the first input signal to the controller.

3. The downforce monitoring system of claim 1, comprising a second sensor communicatively coupled to the controller, wherein the second sensor is configured to couple to the frame of the agricultural row unit and to output the second input signal to the controller.

4. The downforce monitoring system of claim 1, comprising a user interface configured to receive an input indicative of a penetration depth of an opener into soil, wherein the user interface is configured to output the second input signal based on the input indicative of the penetration depth.

5. The downforce monitoring system of claim 4, wherein the controller is configured to determine the angle of the gauge wheel support arm relative to the frame based on the penetration depth of the opener into the soil and a gauge wheel support arm angle/penetration depth calibration.

6. The downforce monitoring system of claim 5, wherein the controller is configured to store the gauge wheel support arm angle/penetration depth calibration for a plurality of row unit configurations and to utilize the gauge wheel support arm/penetration depth calibration corresponding to the row unit configuration of the agricultural row unit.

7. The downforce monitoring system of claim 1, wherein the controller is configured to output a third output signal to a second actuator to control the angle of the gauge wheel support arm relative to the frame based on a target penetration depth of the opener into the soil and a gauge wheel support arm angle/penetration depth calibration.

8. The downforce monitoring system of claim 1, wherein the controller is configured to determine a horizontal offset between the pivot point of the gauge wheel support arm and a rotation axis of the gauge wheel based on the angle and a length of the gauge wheel support arm, and the controller is configured to determine the determined downforce applied to the soil surface by the gauge wheel based on the torque and the horizontal offset.

9. The downforce monitoring system of claim 8, wherein the controller is configured to store the length of the gauge wheel support arm for a plurality of row unit configurations and to utilize the length of the gauge wheel support arm corresponding to the row unit configuration of the agricultural row unit.

10. An agricultural row unit, comprising:
a frame;
a gauge wheel support arm pivotally coupled to the frame and configured to pivot relative to the frame about a pivot point;
a gauge wheel rotatably coupled to the gauge wheel support arm and configured to rotate relative to the gauge wheel support arm about a rotation axis; and
a controller comprising a memory and a processor, wherein the controller is configured to:
receive a first input signal indicative of torque applied to the gauge wheel support arm about the pivot point;
receive a second input signal indicative of an angle of the gauge wheel support arm relative to the frame;
determine a determined downforce applied to the soil surface by the gauge wheel based on the torque and the angle; and
output a first output signal indicative of the determined downforce, output a second output signal to a downforce actuator to control a downforce applied to the soil surface by the gauge wheel based on the determined downforce and a target downforce, or a combination thereof.

11. The agricultural row unit of claim 10, comprising:
a depth adjustment handle non-rotatably coupled to the gauge wheel support arm and configured to drive the gauge wheel support arm to rotate about the pivot point; and
a first sensor mounted to the depth adjustment handle and communicatively coupled to the controller, wherein the first sensor is configured to output the first input signal to the controller.

12. The agricultural row unit of claim 10, comprising a second sensor mounted to the frame and communicatively coupled to the controller, wherein the second sensor is configured to output the second input signal to the controller.

13. The agricultural row unit of claim 10, comprising a user interface configured to receive an input indicative of a penetration depth of an opener into soil, wherein the user interface is configured to output the second input signal based on the input indicative of the penetration depth.

14. The agricultural row unit of claim 13, wherein the controller is configured to determine the angle of the gauge wheel support arm relative to the frame based on the penetration depth of the opener into the soil and a gauge wheel support arm angle/penetration depth calibration.

15. The agricultural row unit of claim 10, wherein the controller is configured to determine a horizontal offset between the pivot point of the gauge wheel support arm and the rotation axis of the gauge wheel based on the angle and a length of the gauge wheel support arm, and the controller is configured to determine the downforce applied to the soil surface by the gauge wheel based on the torque and the horizontal offset.

16. One or more tangible, non-transitory, machine-readable media comprising instructions configured to cause a processor of a controller to:
receive a first input signal indicative of torque applied to a gauge wheel support arm about a pivot point of the gauge wheel support arm;
receive a second input signal indicative of an angle of the gauge wheel support arm relative to a frame of the agricultural row unit;
determine a determined downforce applied to a soil surface by a gauge wheel rotatably coupled to the gauge wheel support arm based on the torque and the angle; and
output an output signal to a downforce actuator to control a downforce applied to the soil surface by the gauge wheel based on the determined downforce and a target downforce.

17. The one or more tangible, non-transitory, machine-readable media of claim 16, wherein the instructions are configured to cause the processor to determine the angle of the gauge wheel support arm relative to the frame based on a penetration depth of an opener into soil and a gauge wheel support arm angle/penetration depth calibration.

18. The one or more tangible, non-transitory, machine-readable media of claim 16, wherein the instructions are configured to cause the processor to output another output signal to a second actuator to control the angle of the gauge wheel support arm relative to the frame based on a target penetration depth of an opener into soil and a gauge wheel support arm angle/penetration depth calibration.

19. The one or more tangible, non-transitory, machine-readable media of claim 16, wherein the instructions are configured to cause the processor to determine a horizontal offset between the pivot point of the gauge wheel support arm and a rotation axis of the gauge wheel based on the angle and a length of the gauge wheel support arm, and the instructions are configured to cause the processor to determine the downforce applied to the soil surface by the gauge wheel based on the torque and the horizontal offset.

20. The one or more tangible, non-transitory, machine-readable media of claim 19, wherein the instructions are configured to cause the processor to store the length of the gauge wheel support arm for a plurality of row unit configurations within a memory and to utilize the length of the gauge wheel support arm corresponding to the row unit configuration of the agricultural row unit.

* * * * *

UNITED STATES PATENT AND TRADEMARK OFFICE
CERTIFICATE OF CORRECTION

PATENT NO.           : 11,224,159 B2
APPLICATION NO.      : 16/457356
DATED                : January 18, 2022
INVENTOR(S)          : Dennis George Thompson and Nicholas George Alfred Ryder It is certified that error appears in the above-identified patent and that said Letters Patent is hereby corrected as shown below:

In the Specification

Column 5, Lines 40-42: "the linkage assembly includes 34 the upper link 36 and the lower link 38" should be "the linkage assembly 34 includes the upper link 36 and the lower link 38"

Column 8, Lines 10-11: "the torque sensor 98 may output the first single indicative of the torque" should be "the torque sensor 98 may output the first signal indicative of the torque"

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*